(12) United States Patent
Münning et al.

(10) Patent No.: US 12,735,033 B2
(45) Date of Patent: Sep. 15, 2026

(54) METHOD AND DRIVER ASSISTANCE SYSTEM FOR ASSISTING A MOTOR VEHICLE WHEN CORNERING

(71) Applicant: Volkswagen Aktiengesellschaft, Wolfsburg (DE)

(72) Inventors: Daniel Münning, Braunschweig (DE); Jannis Hoppe, Braunschweig (DE)

(73) Assignee: Volkswwagen Aktiengesellschaft, Wolfsburg (DE)

( * ) Notice: Subject to any disclaimer, the term of this patent is extended or adjusted under 35 U.S.C. 154(b) by 194 days.

(21) Appl. No.: 18/280,130

(22) PCT Filed: Feb. 15, 2022

(86) PCT No.: PCT/EP2022/053714
§ 371 (c)(1),
(2) Date: Sep. 26, 2023

(87) PCT Pub. No.: WO2022/179893
PCT Pub. Date: Sep. 1, 2022

(65) Prior Publication Data

US 2024/0308509 A1 Sep. 19, 2024

(30) Foreign Application Priority Data

Feb. 23, 2021 (DE) ......................... 102021201677.4

(51) Int. Cl.
*B60W 30/14* (2006.01)
*B60W 30/18* (2012.01)
*B60W 30/182* (2020.01)

(52) U.S. Cl.
CPC .... *B60W 30/143* (2013.01); *B60W 30/18145* (2013.01); *B60W 30/182* (2013.01);
(Continued)

(58) Field of Classification Search
CPC ............... B60W 30/00; B60W 30/143; B60W 30/18145; B60W 30/182; B60W 2552/30;
(Continued)

(56) References Cited

U.S. PATENT DOCUMENTS 9,189,897 B1 * 11/2015 Stenneth ............... B60W 50/14
11,059,484 B2 * 7/2021 Fujiwara .......... G08G 1/096775
(Continued)

FOREIGN PATENT DOCUMENTS

CN 107107914 A 8/2017
DE 102012011171 A1 12/2013
(Continued)

OTHER PUBLICATIONS

English description translation for DE102016220406A1. (Year: 2018).*

(Continued)

*Primary Examiner* — Erin M Piateski
*Assistant Examiner* — David Mesquiti Ovalle
(74) *Attorney, Agent, or Firm* — Peter Zura; LOZA & LOZA, LLP

(57) ABSTRACT

Apparatus, system and method for assisting a motor vehicle in assisted cornering. In order to carry out the cornering, two different assistance modes are provided in the driver assistance system, and from each of these modes different potential cornering speeds for driving through the corner are provided. A selection routine is configured in order to prioritize one of the two potential cornering speeds as a target speed for driving through the corner. According to the selection routine, a set driving mode can be taken into account, for example. Additionally or alternatively, a tiredness level of the driver can be incorporated into the selection.

20 Claims, 3 Drawing Sheets

Figure 1:

(52) U.S. Cl.
CPC ... *B60W 2520/10* (2013.01); *B60W 2520/125* (2013.01); *B60W 2552/30* (2020.02)

(58) Field of Classification Search
CPC ....... B60W 2520/10; B60W 2520/125; B60W 2520/00; B60W 2552/00
USPC ............................................................ 701/93
See application file for complete search history.

(56) References Cited

U.S. PATENT DOCUMENTS

2009/0037062 A1* 2/2009 Lee ..................... B60W 30/143
701/70
2013/0328699 A1 12/2013 Schramm et al.
2016/0200317 A1 7/2016 Danzl et al.
2018/0194365 A1 7/2018 Bae
2020/0180617 A1 6/2020 Tezuka et al.
2020/0339138 A1* 10/2020 Ko ..................... B60W 40/072
2020/0377082 A1* 12/2020 Nassouri ........... B60W 30/0956
2020/0387167 A1* 12/2020 Sujan .................. B60W 30/143
2022/0009487 A1 1/2022 Belle et al.

FOREIGN PATENT DOCUMENTS

DE 102013013867 A1 3/2015
DE 102014215259 A1 2/2016
DE 102016215046 A1 2/2018
DE 102016215064 A1 2/2018
DE 102016220406 A1 * 4/2018 ............ B60W 30/10
DE 102018207806 A1 11/2019
EP 1241066 A2 9/2002
WO 2020104738 A1 5/2020

OTHER PUBLICATIONS

English drawing translation for DE102016220406A1. (Year: 2018).*
PCT/EP2022/053714. International Search Report (Jun. 9, 2022).
Priority German Application No. 102021201677.4. Examination Report (Nov. 10, 2021).

* cited by examiner

METHOD AND DRIVER ASSISTANCE SYSTEM FOR ASSISTING A MOTOR VEHICLE WHEN CORNERING

RELATED APPLICATIONS

The present application claims priority to International Patent Application No. PCT/EP2022/053714 to Münning et al., filed Feb. 15, 2022, titled "Method And Driver Assistance System For Assisting A Motor Vehicle In Performing A Cornering Maneuver," which claims priority to German Pat. App. No. 10 2021 201 677.4 filed Feb. 23, 2021, to Münning et al., the contents of each being incorporated by reference in their entirety herein.

BACKGROUND

The present disclosure relates to technologies and techniques for supporting cornering of a motor vehicle using a driver assistance system. The present disclosure also relates to a driver assistance system for assisting a motor vehicle with cornering.

A driver assistance system is typically used in a motor vehicle, to assist a driver in driving the motor vehicle. For example, a motor vehicle can be assisted or (partially) automated, i.e., accelerated and braked, using a driver assistance system. In this way, the driver assistance system can be used to stop or adjust the current driving speed of the motor vehicle. Thus, for example, it is possible to set the desired speed set by a driver and/or to react to a detected speed restriction for a valid traffic speed.

In addition, or alternatively, assisted or (partially) automated lateral guidance, in other words, steering of the motor vehicle by means of the driver assistance system, is contemplated. In this way, the driver assistance system can assist in a change of the driving direction of the motor vehicle. Thus, for example, you can maintain a lane or undertake a lane change initiated by the driver.

With such a driver assistance system, for example, the motor vehicle can be assisted with cornering. An equivalent method is known, for example, from DE 10 2016 215 064 A1. Here, a current motor vehicle speed is adapted when driving through a curve as a function of a curve parameter and an occupant preference.

Furthermore, from DE 10 2012 011 171 A1 a method is disclosed for the displaying of a recommended cornering speed for a driver of a vehicle. The recommended cornering speed can be used by the driver to guide the motor vehicle through the corner.

From US 2018/0194365 A1, a method is disclosed for generally assisting with a journey with a motor vehicle. Depending on a driver type and a detected driver condition, at least one or more assistance functions are selected to assist with the driving.

However, in the case of active lateral guidance through a curve, there may be requirements that limit a maximum permissible or permitted cornering speed at which the motor vehicle may be steered with assisted lateral guidance through the curve. In the case of active longitudinal guidance, there is usually no such legal requirement. In this case, the cornering speed, for example, depends on a desired speed set by the driver or a current traffic speed. If the motor vehicle now needs to be driven through the curve with assisted longitudinal and lateral guidance, there may be different specifications for the driving speed to be set for driving through the curve.

SUMMARY

Aspects of the present disclosure are directed to resolving discrepancy between different speed specifications for assisted or (partially) automated cornering.

Some aspects are disclosed in the objects of the independent patent claims. Other possible embodiments of the present disclosure are disclosed in the subclaims, the description and the figures.

In some examples, a method is disclosed for assisting a motor vehicle in cornering by means of a driver assistance system that provides two different assistance modes. "Provided" means, for example, that both assistance modes are perceptible on the part of the driver. Thus, for example, a driver of the motor vehicle may select and/or activate one of the modes as desired or preferred to assist him or her in driving. Alternatively, it is conceivable that the two assistance modes could be provided together on the driver's side in combination mode for the driver to select. On the driver's side, for example, only the combination mode is perceptible and can then be selected and/or activated for assistance while driving. Thus, the distinction between the modes, for example, can be made only at the technical level, i.e., in the background.

The present disclosure also relates to a driver assistance system for assisting a motor vehicle and/or its driver in performing cornering as previously described. The present disclosure may also relate to a motor vehicle having an appropriate driver assistance system.

Other features of the present disclosure may be apparent from the following description of figures and from the drawing. The features and combinations of features mentioned above in the description, as well as the features and combinations of features shown below in the figure description and/or in the figures alone, can be used not only in the combination indicated in each case, but also in other combinations or on their own, without departing from the scope of the present disclosure.

SUMMARY

Figure 2:
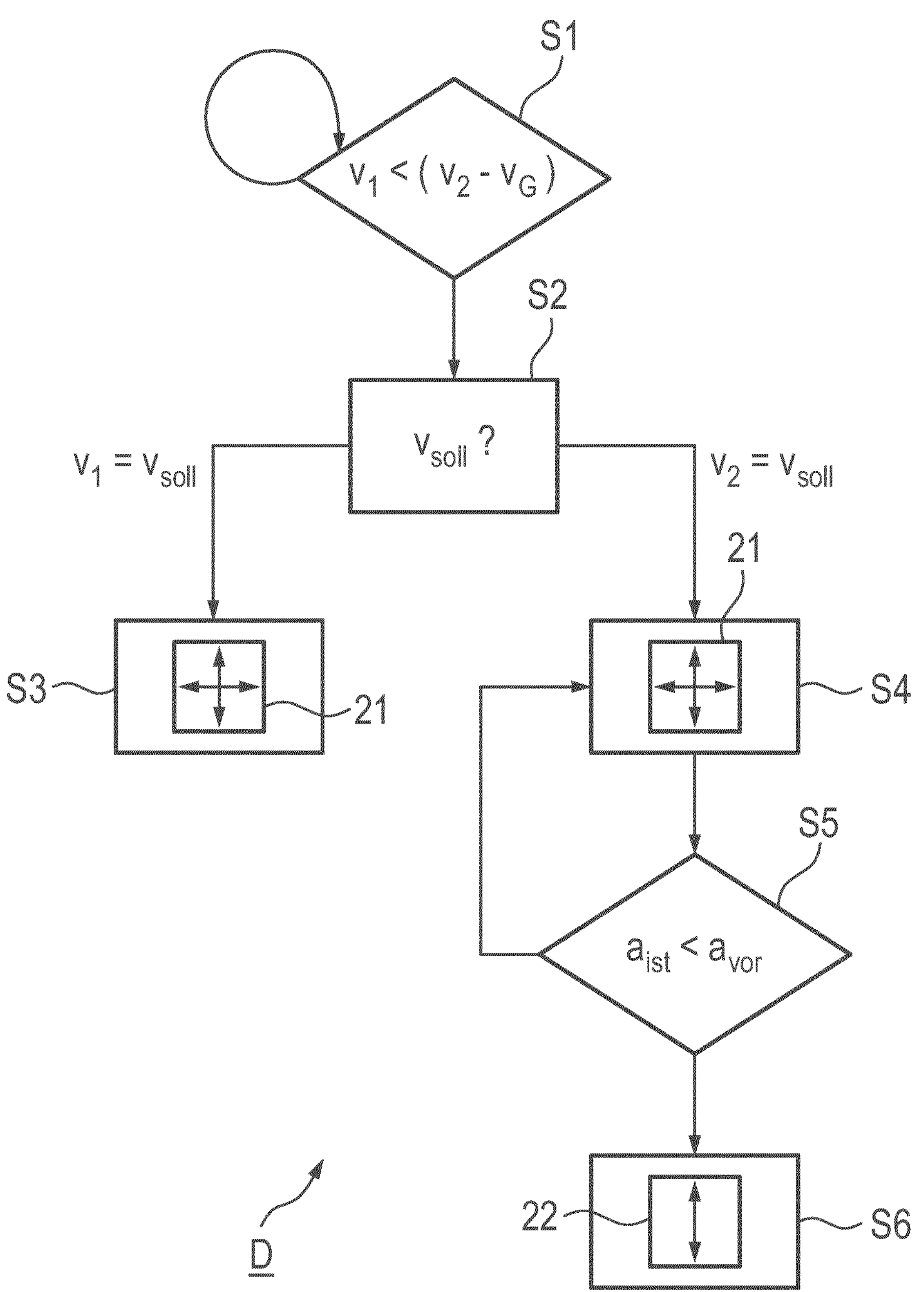
Figure 3:
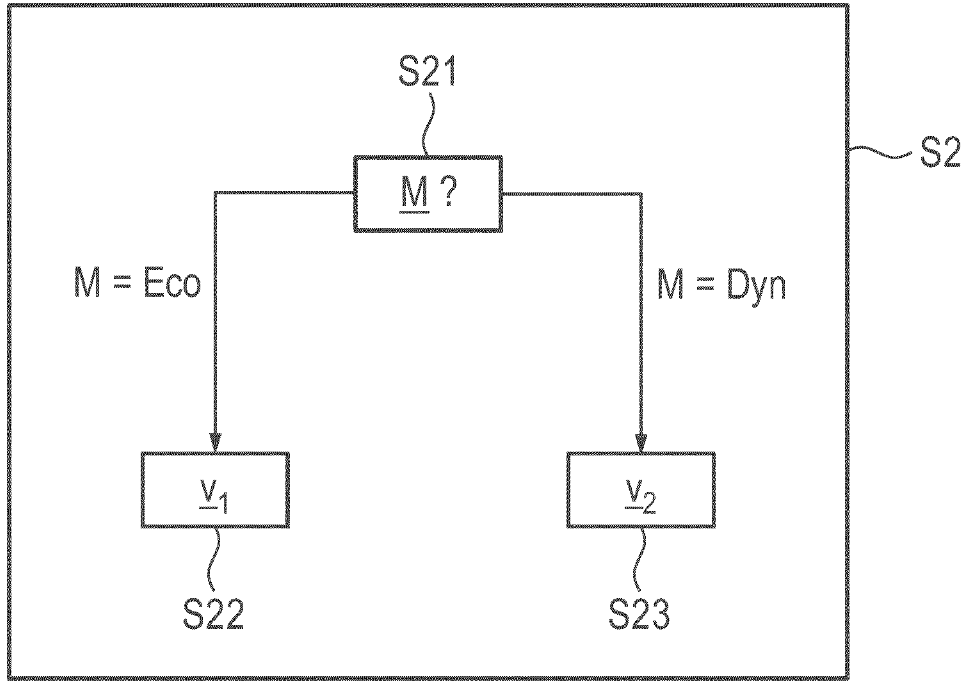

The drawings show the following:

FIG. 1 shows a schematic illustration of a motor vehicle, and the approaching of a curve for assisted cornering on a curve, according to some aspects of the present disclosure;

FIG. 2 shows a schematic representation of a process flow diagram with individual process steps for selecting a cornering speed for the motor vehicle to perform cornering, according to some aspects of the present disclosure; and FIG. 3 shows a schematic representation of one of the method steps according to FIG. 2 concerning the selection of the cornering speed depending on a driving mode of the motor vehicle, according to some aspects of the present disclosure.

DETAILED DESCRIPTION

Identical or functionally identical elements are given the same reference signs in the figures.

In some examples, in a first of the assistance modes, assisted lateral guidance and longitudinal guidance of the motor vehicle is performed or provided. When assistance mode 1 is activated, this means that acceleration (positive or negative) or maintaining the driving speed as well as steering the motor vehicle are at least partially taken over. Assistance mode 1 can, for example, be a so-called Travel Assist.

In contrast, in a second assistance mode, only assisted longitudinal guidance of the motor vehicle is performed or provided. Thus, when assistance mode 2 is activated, only accelerating or maintaining the driving speed of the motor vehicle is implemented. Assistance mode 2 can, for example, be a so-called Active Cruise Control (ACC).

In the present context, "assisted" as used herein means that the respective assistance function is performed or executed to support the driver in certain driving tasks. In this context, assisted can also be understood as (partially) automated driving, so that the motor vehicle can perform individual driving tasks or functions at least temporarily without the driver's intervention.

The two assistance modes may overlap in their assistance function of longitudinal guidance. This means that when Assistance mode 1 is activated, speed data of assistance mode 2 can be used for longitudinal guidance, for example. In this way, the Travel Assist can access speed data from the ACC regarding longitudinal guidance, such as a driving speed to be set.

Regardless of the selected assistance mode, this means a desired speed preset by the driver or a currently permissible traffic speed can be maintained or set as the driving speed, for example. The term "set", for example, refers to the ability to accelerate or decelerate to the desired speed or traffic speed.

The situation is different if the motor vehicle is to be assisted through a curve with assistance. If lateral guidance is active, i.e., assistance mode 1 is activated, the specifications for the aforementioned maximum permitted cornering speed must be observed.

Such a requirement is known, for example, from the UN ECE R79 Directive. This specifies the maximum lateral acceleration, which the vehicle may be subjected when negotiating a bend. The maximum lateral acceleration can be specified, for example, taking into account a driving speed and a curve geometry of the curve. The curve geometry may include, for example, data about a curve radius and/or a lane width. The faster a motor vehicle now travels in the curve, the higher the lateral acceleration affects the motor vehicle. However, since the lateral acceleration for active steering is limited, this also results in a limit for the permitted cornering speed. For assisted lateral guidance, the permitted cornering speed is thus specified by taking the specified lateral acceleration into account.

In contrast, a specified cornering speed for active longitudinal guidance, as described previously, results, for example, from the set desired speed or the traffic speed. The permitted cornering speed for assisted lateral guidance may thus deviate from the cornering speed defined for longitudinal guidance in certain driving situations.

Thus, there are potentially two different cornering speeds available for assisted cornering with Assistance mode 1 activated, in which both lateral guidance and longitudinal guidance need to be implemented. The first potential cornering speed is the permitted cornering speed, which is specified by law, for example, for assisted lateral guidance. The second potential cornering speed is the specified cornering speed that is specified for assisted longitudinal guidance, for example, as the driver's desired speed.

Aspects of the present disclosure are directed to addressing this discrepancy between the different speed specifications, prioritizing one of the two potential cornering speeds over the other. For this purpose, in the method according to the present disclosure, the first potential cornering speed for driving through the curve ahead in Assistance mode 1 is compared with the second potential cornering speed for driving through the curve in assistance mode 2. If the comparison between the two potential cornering speeds shows that the first potential cornering speed is less than the second potential cornering speed, a specified selection is used to select one of the potential cornering speeds as a setpoint for the driving speed to be preset for driving through the curve. The specific design of the selection routine will be discussed in greater detail later.

Depending on which of the potential cornering speeds is selected according to the selection routine, two potential scenarios are now possible for the assisted execution of the cornering. In the case where the first potential cornering speed is selected as the setpoint, Assistance mode 1 is used for driving through the curve. "Used" in this case means that Assistance mode 1 is either selected, i.e., newly set, or maintained, i.e., has already been activated and now continues to be used. Preferably, the motor vehicle is thus assisted longitudinally and laterally during the entire journey through or along the curve, with the slower Travel Assist speed being used for longitudinal guidance.

If, on the other hand, the second potential cornering speed is selected as a setpoint in accordance with the selection routine, Assistance mode 1 is used only for driving through the curve until a current lateral acceleration of the motor vehicle exceeds the specified lateral acceleration. After that, the system switches from Assistance mode 1 to assistance mode 2. In the present case, "after that" means chronologically after the event. Thus, for example, switching over may be delayed or may occur immediately at the moment in which the current lateral acceleration exceeds the specified lateral acceleration. When switching from the first to assistance mode 2, the motor vehicle is thus only guided longitudinally in an assisted or (partially) automated manner. The lateral guidance must then be carried out manually. This means that the driver must take over the steering himself. In this way, lateral guidance is deactivated at least in sections of the curve.

If the second potential cornering speed is selected as the setpoint, a display device, for example, a display or instrument cluster or head-up display, of the motor vehicle can be controlled. As a result, a driver alert is provided to the driver regarding deactivation of Assistance mode 1. The inactivation of one of the symbols associated with Assistance mode 1 shows its deactivated state.

Using the selection routine results in the advantage, that the discrepancy between the different speed specifications for cornering is resolved. According to the selection routine, one of the two potential cornering speeds is prioritized.

The term "curve", in the sense of the present disclosure, does not mean only an entire section of the route by which the curve is formed. Instead, the term "curve" can also be understood to mean at least a section of the curve (curve section) or a group of curves.

In one embodiment, an issue may arrive as to how to define or specify the two potential cornering speeds. For this purpose, it is intended that the first potential cornering speed be specified depending on an initially defined curve data record and a current driving speed, taking the specified lateral acceleration into account.

For this purpose, for example, a neural network can be used. To determine the first potential cornering speed from this, for example, a vehicle model simulated in the camera device can be used to calculate in real time, i.e., live, an expected lateral acceleration for the motor vehicle in the curve ahead. The calculation can be done empirically using a neural network.

If the calculation shows that the expected lateral acceleration is higher than the specified lateral acceleration, or if the expected lateral acceleration is greater by more than a specified tolerance amount than the specified lateral acceleration, the current driving speed is reduced until the lateral acceleration specification is observed. The tolerance amount may, for example, be 10% of a value of the specified lateral acceleration. Otherwise, for example, the current driving speed or a specified setting speed by which the specified lateral acceleration in the curve is still maintained is set or adjusted as the first potential cornering speed.

The set speed, for example, may be the aforementioned desired speed of the driver or the aforementioned traffic speed to which the motor vehicle needs to be accelerated or decelerated. Thus, the motor vehicle may also be in an acceleration phase when it drives through the curve.

The second curve record can, for example, be route data, i.e. one or more parameters concerning the current driving route. This includes, for example, a speed limit imposed by traffic signs and/or road users. Additionally or alternatively, for example, a swarm speed, i.e., an average driving speed of several other motor vehicles that have already passed through the curve, can be provided as such a parameter. The second curve data record can be determined, for example, by evaluating digital map data provided by a navigation device associated with the driver assistance system. In addition or alternatively, providing the second curve data record by evaluating the distance measurement data from a radar system of the motor vehicle is conceivable.

Alternatively to the aforementioned embodiment, it is possible that the two potential cornering speeds are determined, for example, from a common curve data record as described previously by way of an example. The first cornering speed, in particular, is determined from the common curve data record, taking the given lateral acceleration into consideration, while the second cornering speed is specified based on a different preference. This means that a setpoint for the second cornering speed can be calculated, for example, without taking the lateral guidance limits into account.

The aforementioned selection routine will be discussed in greater detail in the examples outlined below.

In some examples, the selection routine may be performed when the first cornering speed differs from the second cornering speed by at least a predefined limit value when compared. In other words, the first cornering speed should be less than or equal to a difference between the second cornering speed and the limit value in order for the selection routine to be performed. For example, the limit value may be specified as a speed value of 10 km/h, or 15 km/h, or 20 km/h. This prevents the driver from being alerted to the conflict of the driver assistance system even in the case of minor deviations.

In some examples, the setpoint value may be selected as a function of a preset driving profile mode of the motor vehicle with respect to the selection routine. The driver assistance system can acquire the driving profile mode from the system settings data of the motor vehicle, for example. The driving profile mode can be set, for example, by a driver of the motor vehicle by means of an operator input. If, for example, a dynamic driving mode, e.g., a sports mode, is now recorded as the driving profile mode, the faster of the two cornering speeds, i.e., the second potential cornering speed, is selected in the selection routine. If, on the other hand, comfort mode or economy mode is selected as the driving profile mode, for example, the slower cornering speed, i.e., the first potential cornering speed, can be set as the setpoint. This has the advantage that driver preference is taken into account for prioritizing the cornering speed.

In some examples, the setpoint may be selected according to the selection routine as a function of a shift knob position representing a specific transmission mode of the motor vehicle. The motor vehicle can have a dual clutch gear system here. Typically, two different transmission modes, namely a manual mode and an automated mode, are provided by such a dual clutch gear system (DSG) to operate the motor vehicle. In manual mode, a change occurs as a result of a driver input, for example via a rocker switch. In automatic mode, on the other hand, gear changes are automated, i.e., carried out without the driver's intervention and tare performed independently. If manual mode is now detected on the basis of the shift knob position, for example, the second potential cornering speed for driving through the curve can be selected. In fact, when manual mode is set, it is assumed that the driver wants to drive the motor vehicle himself as much as possible, and is willing to take over the steering, in particular, at any time. In automatic mode, on the other hand, it can rather be assumed that the driver wants the curve driving to be as fully automated or as assisted as possible. This also has the advantage that the driver's preference is taken into consideration when selecting the cornering speed.

In another example, the setpoint may be selected according to the selection routine as a function of a detected occupant condition of any occupant in the motor vehicle. Occupant condition means, in particular, a physical state or state of health of the respective occupant in the motor vehicle, especially a driver. In particular, the aim is to detect any discomfort or fatigue in one of the occupants by detecting the occupants' condition and to select the setpoint accordingly.

In doing so, the first potential cornering speed value can be selected if an occupant condition is detected that could indicate discomfort or represents the occupants' fatigue. Otherwise, the second potential cornering speed is selected as the setpoint value.

This can prevent the lateral guidance from being aborted in the curve, although the driver is currently distracted from the traffic situation by his condition. Selecting the slower cornering speed for assisted lateral guidance can also prevent deterioration of the occupant condition while driving.

In some examples, driver assistance system can detect the occupant condition based on observation data or image data using an occupant observation device, such as an interior camera. A condition value concerning the respective occupant condition can be acquired by evaluating the observation data using known image processing methods, such as pattern detection.

Thus, for example, the condition value provides information about whether the respective occupant is unwell or not. "Unwell" means that the occupant is feeling dizzy and/or nauseous. For example, a color tone of an occupant's face, a pupil width, conductance of the skin, a moisture value indicating, for example, increased perspiration in the occupant, a heart rate, another vital sign value, and/or another value describing the physical or health condition can be acquired as a status value. It is possible to determine whether the occupant is unwell or not, and to check whether the detected status value is within a specific, specified limit value range. For example, the limit value range establishes a range, which is associated with the discomfort of the occupant. Within the limit value range, it can be concluded that the occupant is unwell. Outside the limit range, on the other hand, it is possible to confirm the occupant well-being.

In another example, the setpoint may be selected according to the selection routine as a function of the motor vehicle driver's detected condition of attentiveness. Thus, it is a matter of determining how attentively the driver is currently observing or following the operation of the motor vehicle and/or a traffic event. In the process, on determining the state of attentiveness representing driver inattentiveness, the first potential cornering speed value shall be selected. Otherwise, the second potential cornering speed is selected as the setpoint value. This has the advantage of checking whether the driver is prepared to take over the steering of the motor vehicle himself promptly when switching from Assistance mode 1 to assistance mode 2. This prevents the vehicle from swerving and thus improves road safety.

In order to determine the state of attention, it is possible, for example, to check whether and/or how and/or with what gripping force the driver grips the steering wheel. Additionally or alternatively, the direction of the driver's gaze can be checked to determine the state of attentiveness. For example, an interior camera of the motor vehicle and/or a capacitive sensor device in the steering wheel of the motor vehicle can be used for this purpose.

According to another embodiment, the setpoint may be selected in the selection routine as a function of the recorded weather data in the vicinity of the motor vehicle. The weather data describe current weather conditions in the vicinity of the motor vehicle. The term "environment" may refer to a current route as well as sections of the route that will potentially to be traveled by the motor vehicle in the future. Here, the aim is to detect any impairment in the driving operations due to weather conditions; this is done by recording the weather data and selecting the setpoint accordingly. In doing so, the first potential cornering speed value can be selected when weather data representing degraded driving is detected. Otherwise, the second potential cornering speed is selected as the setpoint value.

The driver assistance system can acquire the weather data externally, for example, by means of a communication module. Alternatively, the motor vehicle itself may be equipped with weather sensors to collect weather data and provide it to the driver assistance system. Weather data may include, for example, one or more weather-related values, such as a temperature value, a humidity value, a sun position, and/or other weather-related parameters. In order to determine whether the driving operation is impaired on the basis of the weather data, it is possible to check whether the respective weather-related value is within a specified limit value range. The limit value range specifies an interval in which the impairment is confirmed. For example, impairment can be confirmed for temperatures below 4 degrees, a sun angle of elevation less than 30 degrees starting from a road surface, fog formation, or moisture values that indicate a wet road surface. This has the advantage that the cornering speed is adapted to current weather conditions. This allows the operation of the motor vehicle to be adjusted in the event of a slippery or wet road or poor visibility, thereby improving road safety.

In another embodiment, in connection with the selection routine, it is foreseen that the setpoint is selected as a function of sensed swarm data of a swarm of motor vehicles, the swarm data comprising an average cornering speed of the swarm of motor vehicles for negotiating the corner. The term "swarm" refers to a large number of other motor vehicles that have passed through the curve before the current motor vehicle.

To select the setpoint, a swarm speed value, i.e., the average cornering speed of the motor vehicle swarm, can be determined and compared to the first and second potential cornering speed values. As a setpoint for the cornering speed, for example, you can then select one of the two cornering speeds whose magnitude is closer to the swarm speed value. In addition or alternatively, a limit value can also be defined for each of the two potential cornering speed values by which the potential cornering speed values may deviate maximum from the swarm speed value. If one of the two cornering speed values deviates by more than the limit value, this cornering speed is discarded as the setpoint and the other potential cornering speed is selected as the setpoint. For example, 50 percent of the swarm speed may be specified as the respective limit value.

This has the advantage of providing an additional verification criterion for plausibility of the determined potential cornering speed.

As an alternative to the aforementioned options, regarding which of the potential cornering speeds is selected as the setpoint, the selection can be made depending on a default setting by the driver. Thus, for example, the driver may specify that the first potential cornering speed or the second potential cornering speed should always be used as the setpoint for driving through the curve in the event of a conflict. In particular, another potential cornering speed can be considered for the selection of the setpoint according to the selection routine. The other potential cornering speed may, for example, be the aforementioned swarm speed or an average of the first and second potential cornering speeds. This can then be compared with the first potential cornering speed. If the comparison shows that the further potential cornering speed is less than the first potential cornering speed, one of the potential cornering speeds can be selected as the setpoint for passing through the curve using the specified selection routine. In the event that the other potential cornering speed is selected as the setpoint value in the process, Assistance mode 1 can be used accordingly for driving through the curve until the current lateral acceleration of the motor vehicle exceeds the specified lateral acceleration. After that, for example, you can switch to assistance mode 2.

Turning to FIG. 1, the drawing shows a schematic representation of a motor vehicle 10 from a bird's eye view. The motor vehicle 10 is operated in a driving mode and, while driving, is currently on a straight portion of a roadway 60 and is approaching a curve 61 ahead of the roadway 60. As shown in FIG. 1, the motor vehicle 10 includes a driver assistance system 20. With the driver assistance system 20, the driving operation of the motor vehicle 10 is supported and in particular assisted and/or (partially) automated, i.e., carried out at least partially without the intervention of a driver not shown in FIG. 1. Two different assistance modes (21), (22) are provided by the driver assistance system 20, between which the driver can select to assist driving. Assistance mode 1 (21) enables assisted lateral guidance and longitudinal guidance of the motor vehicle 10. If Assistance mode 1 (21) is activated, the motor vehicle 10 can thus be steered (laterally guided) in an assisted manner and, moreover, also accelerated in an assisted manner, i.e., its speed can be changed (longitudinally guided). The first assistance mode (21) is also referred to hereinafter as travel assist. In contrast, in assistance mode 2 (22), only assisted longitudinal guidance of the motor vehicle 10 is provided. Assistance mode 2 (22) is also referred to below as Active Cruise Control or ACC (automatic distance control).

In order to provide the assisted lateral guidance and/or longitudinal guidance when the assistance mode (21), (22) is activated in each case, a component 30 of the motor vehicle 10 relating to the driving operation is controlled by means of the driver assistance system 20 with an appropriate control command. For longitudinal guidance, for example, a speed control system 31 of the motor vehicle 10 is controlled as component 30. The control signal provided to the cruise control system 31 is, for example, a setpoint or set value for a desired travel speed to be set or a parameter associated with the desired travel speed, such as an acceleration value. For lateral guidance, a steering system 32 of the motor vehicle 10 is controlled as component 30, for example. The control signal, for example, may be a desired setpoint or set value for a steering angle or steering lock angle can be provided by the driver assistance system 20.

In order to operate the motor vehicle in an assisted lateral and longitudinal manner, Assistance mode 1 (21) and assistance mode 2 (22) can be used superimposed over one another, for example. In superimposed use, Assistance mode 1 (21) is switched to assistance mode 2 (22), for example. In other words, in Assistance mode 1 (21), data concerning longitudinal guidance, such as the desired driving speed to be set, is determined analogously to assistance mode 2 (22). How the driving speed to be set is determined in assistance mode 2 (22) is explained in greater detail later.

However, the superimposed use of the two assistance modes (21), (22) for assisted lateral and longitudinal guidance may cause a conflict for the driver assistance system 20 when negotiating a curve. This is because, when performing cornering in Assistance mode 1 (21), a limitation of a maximum predetermined lateral acceleration to which the motor vehicle 10 may be subjected when passing through the corner 61 must be observed. The specifications for limiting the maximum lateral acceleration are based on legal requirements or guidelines, for example.

Such a limitation of lateral acceleration is known, for example, from the UN ECE R79 directive. Accordingly, the lateral acceleration of a motor vehicle when passing through a curve, for example, may not exceed 3 $m/s^2$. This limitation also restricts the speed at which the curve 61 may be negotiated with assisted lateral guidance. The speed at which the curve 61 may be negotiated with assisted lateral guidance is also referred to below as the first potential cornering speed v1.

In order to take the limitation of the lateral acceleration during active lateral guidance into account, the first potential cornering speed v1 is determined in Assistance mode 1 (21) taking the specified lateral acceleration into account, and as a function of a first curve data record 41 and the currently measured driving speed. For acquiring the first curve data record 41, the motor vehicle 10 in FIG. 1 comprises a camera device 40, which, by way of an example, is designed as a front camera. By means of the camera device 10, a preceding ambient horizon of the motor vehicle 10 is recorded and the resulting image data is evaluated. By evaluation, the first curve data record 41 is extracted from the image data.

The first curve data record 41 comprises at least one or multiple parameters concerning a geometry of the curve 61 lying ahead. In this way, for example, the curve data record may include a length of curve 62 and a lane width 63. The parameters are then used to determine a curvature or radius of curvature of the curve 61. Depending on the detected curve geometry, an expected lateral acceleration of the motor vehicle 10 for driving through the curve 61 while maintaining the currently measured driving speed is then calculated, for example in real time, i.e., live during the approach of the motor vehicle 10 to the curve 61. For example, the calculation can be performed empirically using a neural network associated with the motor vehicle 10. The expected lateral acceleration is then compared with the aforementioned specified lateral acceleration.

If the expected lateral acceleration in the curve 61 according to the comparison is less than the predetermined lateral acceleration, for example, the current driving speed of the motor vehicle 10 is maintained for negotiating the curve. The first potential cornering speed v1 is thus set as the current driving speed. If, on the other hand, the expected lateral acceleration is greater than the specified lateral acceleration, the current driving speed must be reduced until the limit value of the specified lateral acceleration is observed again. In this case, the first potential cornering speed v1 is thus set as a target speed corresponding to the specified lateral acceleration. Thus, defining the first potential cornering speed v1 and taking account of the specified lateral acceleration, results in the driving speed limit with which the motor vehicle 10 may be guided through the curve 61.

Regardless of the limitation of the driving speed by Assistance mode 1 (21), a second potential cornering speed v2 is still ascertained due to the aforementioned superimposed use of both assistance modes (21), (22) for the assisted lateral and longitudinal guidance when cornering. In this case, the second potential cornering speed v2 is the driving speed that is determined in assistance mode 2 (22) for driving through the curve 61 and, due to the superimposed use of the assistance modes (21), (22), can also be considered as the potential driving speed for longitudinal guidance when Assistance mode 1 (21) is activated.

The second potential cornering speed v2 is determined as a function of route data and the currently measured driving speed. When cornering, this route data can also be used as a second curve data record designated as 51. The second curve data record 51 or the route data can be determined, for example, by evaluating digital map data provided by a navigation device 50 in association with the driver assistance system 20. The route data, for example, may be traffic data, such as a speed limit detected by means of traffic sign detection for the respective route section being traveled. Thus, the second potential cornering speed v2 can be determined by the driving speed specified by the speed limit. Alternatively, the second potential cornering speed v2, for example, may be equivalent to a driving speed preset by the driver and thus, to the current driving speed of the motor vehicle 10.

This results in different potential cornering speeds v1, v2 for assisted lateral and longitudinal negotiation of a curve. Often, the second potential cornering speed v2 is greater than the first potential cornering speed v1. When using the first potential cornering speed v1 as the driving speed to be preset, the motor vehicle 10 would be guided more slowly through the curve 61, but the cornering could be carried out fully assisted or (partially) automated both laterally and longitudinally. When using the second potential cornering speed v2 as the driving speed to be set, on the other hand, the motor vehicle 10 would be guided more dynamically through curve 61, but the steering would have to be taken over manually at least in sections of the curve.

Thus, the driver assistance system has two different potential cornering speeds v1, v2 for cornering, from which the driver assistance system 20 must select one as the setpoint for setting the new driving speed. FIG. 2 is an example of how this selection can be made.

For this purpose, FIG. 2 shows a schematic process flow diagram with individual process steps for selecting one of the two potential cornering speeds v1, v2 to assist the motor vehicle 10 in performing cornering. In the process, in a step S1, first the potential cornering speed v1 is compared with the second potential cornering speed. In the comparison, as shown in FIG. 2, it is checked, for example, whether the first cornering speed v1 is lower than a difference between the second cornering speed and a specified limit value $v_{Tot}$.

The limit value $v_{Tot}$, for example, may be 5 km/h or 10 km/h. If the comparison according to step S1 shows that the first potential cornering speed v1 differs from the second potential cornering speed v2 by less than the specified limit value $v_{Tot}$, step S1 is repeated for performing the cornering according to the process flow diagram D. If, on the other hand, it is determined that the first potential cornering speed v1 is less than the second potential cornering speed v2 minus the limit value $v_{Tot}$, the process is continued in a step S2.

In the step S2, a selection routine is performed by which exactly one of the two potential cornering speeds v1 or v2 is selected for driving through the curve. The setpoint $v_{Req'd}$ for the longitudinal guidance is determined this way. Which criteria are selected for the two potential cornering speeds v1 or v2 according to the selection routine is described in greater detail later using FIG. 3.

According to FIG. 2, the method is continued in a step S3 when the first potential cornering speed v1 for driving through the curve is selected as the target speed $v_{Req'd}$. According to step S3, the first assistance module (21) is used in this case to guide the motor vehicle 10 laterally and longitudinally in an assisted manner for driving through the curve. Accordingly, Assistance mode 1 (21) can be maintained for the cornering. Curve 61 is thus traversed more slowly, but driven through completely longitudinally and laterally.

If, on the other hand, the second potential cornering speed v2 is selected as the target speed $v_{Req'd}$, according to the selection routine in step S2, the process is continued in a step S4. In step S4, Assistance mode 1 (21) is also initially used for driving through the curve. However, while the curve is being negotiated, a step S5 continuously checks whether the current lateral acceleration of the motor vehicle 10 is also lower than the aforementioned specified lateral acceleration $a_{Prev}$. A tolerance range for the deviation between the expected lateral acceleration and the specified lateral acceleration $a_{Actl}$ is taken into account here. In other words, a lateral acceleration limit value may be selected, which may be set as 10 percent of the predetermined lateral acceleration, for example.

If it is determined in step S5 that the expected lateral acceleration $a_{Act'l}$ is less than the specified lateral acceleration $a_{Act'l}$, the procedure reverts back to step S4 again. If, on the other hand, it is determined in step S5 that the expected lateral acceleration $a_{Act'l}$ is also higher than the specified lateral acceleration $a_{Prev}$ in the curve, the procedure is continued in a step S6.

In step S6, the system then switches from Assistance mode 1 (21) to assistance mode 2 (22). Thus, the motor vehicle 10 is guided in an assisted manner only for driving through the curve 61 or at least a section of the curve 61. The lateral guidance, i.e. the steering, must then be taken over manually by the driver. In summary, when the second potential cornering speed v2 is selected as the target speed $v_{Req'd}$ according to step S2 in Assistance mode 1 (21) should only be used for driving through curve 61 until the current lateral acceleration $a_{Act'l}$ also exceeds the specified lateral acceleration $a_{forw}$. Assistance mode 1 (21) switches to assistance mode 2 then. In other words, the lateral guidance of the motor vehicle 10 when driving through the curve can be deactivated at least in sections of the curve or temporarily.

FIG. 3 now once again shows a depiction of a process flow diagram with individual process substeps to step S2, which are carried out in order to select one of the two potential cornering speeds v1, v2 as the target speed $v_{Req'd}$ according to the aforementioned selection routine. According to FIG. 3, the selection is made as a function of a preset driving profile mode M for motor vehicle 10. For this purpose, a substep S21 is initially used to according to the selection routine to check which driving profile mode M is currently set for motor vehicle 10. The driver assistance system 20 can detect driving profile mode M, for example, on the basis of system settings that are stored in a memory device of the motor vehicle that is not shown and, for example, have been specified by a driver. If ECO comfort mode is preset or stored as driving profile mode M, the procedure is continued in a substep S22. In step S22, the first potential cornering speed v1 is selected as the target speed $v_{Req'd}$ for driving through the curve. If, on the other hand, a dynamic mode DYN is detected as the driving profile mode M on the basis of the system settings, the procedure is continued in a substep S23. In the substep S23, the second potential cornering speed v2 is selected as the target speed for passing through curve 61.

Alternatively or in addition to the embodiment of the selection routine according to step S2 shown in FIG. 3, the selection of the setpoint $v_{Req'd}$ can take place as a function a detected occupant status of the respective occupant in the motor vehicle 10. A drowsiness value of the occupant, such as the driver, can be detected as the occupant status. The fatigue value indicates whether the occupant is tired or not and thus reflects a fatigue level of the occupant. It is a matter of detecting fatigue of one of the occupants by detecting the occupant status, in particular, and selecting the setpoint $v_{Req'd}$ accordingly. If an occupant condition representing occupant fatigue is detected in this process, the first potential cornering speed value v1 can be selected. Otherwise, the second potential cornering speed value v2 is selected as the setpoint $v_{Req'd}$. For example, the fatigue value can be an eyelid opening angle of an eye of the occupant or a blink frequency of the occupant. To detect the drowsiness value, the driver assistance system 20, for example, records and evaluates observation data or image data of the occupant by means of an occupant camera. Well-known image processing methods, such as pattern recognition, for example, can be used for this evaluation. Thus, the selection of the target speed $v_{Req'd}$ for driving through curve 61 can be selected depending on whether the driver is prepared, for example, to take over lateral guidance at any time while driving through curve 61 or whether the driver's reaction time is likely to be limited due to fatigue.

Additionally or alternatively, it is conceivable to make the selection from the two potential cornering speeds v1, v2 according to the selection routine in step S2 depending on detected swarm data from a motor vehicle swarm. In this case, the swarm data includes an average turn speed of the motor vehicle swarm (swarm speed) for passing through curve 61. Thus, for example, the selection routine can check whether the first potential cornering speed v1 and the second potential cornering speed v2 deviate from the swarm velocity by a specified limit value. As an example, a value can be specified as a limit value that deviates by 50 percent from the determined swarm speed.

The limit value determines interval limits for a swarm velocity interval in which the first potential cornering speed v1 and the second potential cornering speed v2 should lie in order to be considered in the selection. A plausibility check can thus be performed for the selection of the target speed.

If one of the two potential cornering speeds v1, v2 thereby lies outside the interval, then the corresponding cornering speed v1, v2 is discarded due to implausibility. The other of the two cornering speeds v1, v2 are then selected as the target speed $v_{Req'd}$. For example, if both potential cornering speeds v1, v2 are within the swarm speed interval, the one closer to the specified swarm velocity can be selected. However, if both potential cornering speeds v1, v2 are outside the specified swarm interval, for example, the detected swarm speed can be set as the new setpoint $v_{Req'd}$. In this case, the process according to FIG. 2 can then be continued, for example, in the aforementioned step S4.

Overall, the examples show how different assistance modes can be used to optimize a vehicle's cornering speed for assisted or (partially) automated cornering.

LIST OF REFERENCE SIGNS

10 Motor vehicle
20 Driver assistance system
21 Assistance mode 1
22 Assistance mode 2
30 Component
31 Cruise control system
32 Steering system
40 Vicinity detection device
41 First curve data record
50 Navigation device
51 second curve data record
60 Roadway
61 Curve
62 Curve length
63 Lane width
$a_{Act'l}$ expected lateral acceleration
$A_{Prev}$ Specified lateral acceleration
D Process flow diagram
DYN Dynamic mode
ECO Comfort mode
M Driving mode
S1 Process step
S2 Process step
S3 Process step
S4 Process step
S5 Process step
S6 Process step
S21 Below limit
S22 Below limit
S23 Below limit
v1 First potential Cornering speed
v2 Second potential Cornering speed
$V_G$ Limit value
$V_{Req'd}$ Target speed

The invention claimed is:

1. A method for assisting cornering of a motor vehicle using a driver assistance system, comprising:

configuring a first assistance mode for the driver assistance system to perform assisted lateral guidance and longitudinal guidance of the motor vehicle;

configuring a second assistance mode for the driver assistance system to perform longitudinal guidance of the motor vehicle;

comparing, based on sensor data comprising a curve data record and a specified lateral acceleration limit for the motor vehicle, (i) a first potential cornering speed under the first assistance mode for driving through a curve, wherein the first potential cornering speed comprises a permitted cornering speed determined based on the specified lateral acceleration limit and the curve data record, and (ii) a second potential cornering speed under the second assistance mode for driving through the curve, wherein the second potential cornering speed is determined independent of the specified lateral acceleration limit for longitudinal guidance of the motor vehicle; and selecting one of the first or second potential cornering speeds as a target speed setpoint for driving through the curve using a specified selection routine, wherein the target speed setpoint is configured to be applied by the driver assistance system to control the steering system and/or the cruise control system during cornering, if the comparing determines that the first potential cornering speed is less than the second potential cornering speed.

2. The method of claim 1, wherein the first assistance mode is selected for driving through the curve if the first potential cornering speed is selected as a target speed setpoint, or the first assistance mode is selected for driving through the curve if the second potential cornering speed is selected as the target speed setpoint, and subsequently selecting the second assistance mode when a current lateral acceleration of the motor vehicle exceeds the predetermined lateral acceleration.

3. The method of claim 1, wherein the first potential cornering speed is defined as a function of a first specified curve data record.

4. The method of claim 3, wherein the second potential cornering speed is defined as a function of a second specified curve data record, which is different from the first curve data record, and the current driving speed.

5. The method of claim 1, wherein the selection routine is performed only if the comparing determines that the first potential cornering speed deviates from the second potential cornering speed by at least a predetermined limit value.

6. The method of claim 1, wherein the target speed setpoint is selected as the selection routine as a function of one of:

a preset driving profile mode of the motor vehicle, a shift knob position representing a respective gear box mode for the motor vehicle, a function of a detected occupant state of an occupant of the motor vehicle, or a detected state of attention of a driver of the motor vehicle, or detected weather data in the surroundings of the motor vehicle.

7. The method of claim 1, wherein the target speed setpoint is selected as the selection routine as a function of detected swarm data of a motor vehicle swarm, the swarm data comprising an average cornering speed of the motor vehicle swarm for passing through the curve.

8. A system for assisting cornering of a motor vehicle using a driver assistance system, comprising:

a memory device; and a driver assistance system, operatively coupled to the memory device, the driver assistance system being configured to:

configure a first assistance mode for the driver assistance system to perform assisted lateral guidance and longitudinal guidance of the motor vehicle;

configure a second assistance mode for the driver assistance system to perform longitudinal guidance of the motor vehicle;

compare, based on sensor data comprising a curve data record and a specified lateral acceleration limit for the motor vehicle, (i) a first potential cornering speed under the first assistance mode for driving through a curve, wherein the first potential cornering speed comprises a permitted cornering speed determined based on the specified lateral acceleration limit and the curve data record, and (ii) a second potential cornering speed under the second assistance mode for driving through the curve, wherein the second potential cornering speed is determined independent of the specified lateral acceleration limit for longitudinal guidance of the motor vehicle; and select one the first or second potential cornering speeds as a target speed setpoint for driving through the curve using a specified selection routine, wherein the target speed setpoint is configured to be applied by the driver assistance system to control the steering system and/or the cruise control system during cornering, if the comparing determines that the first potential cornering speed is less than the second potential cornering speed.

9. The system of claim 8, wherein the driver assistance system is configured to select the first assistance mode for driving through the curve if the first potential cornering speed is selected as the target speed setpoint, or select the first assistance mode for driving through the curve if the second potential cornering speed is selected as the target speed setpoint, and subsequently select the second assistance mode when a current lateral acceleration of the motor vehicle exceeds the predetermined lateral acceleration.

10. The system of claim 8, wherein the first potential cornering speed is defined as a function of a first specified curve data record.

11. The system of claim 10, wherein the second potential cornering speed is defined as a function of a second specified curve data record, which is different from the first curve data record, and the current driving speed.

12. The system of claim 8, wherein the selection routine is performed only if the comparing determines that the first potential cornering speed deviates from the second potential cornering speed by at least a predetermined limit value.

13. The system of claim 8, wherein the target speed setpoint is selected as the selection routine as a function of one of:

a preset driving profile mode of the motor vehicle, a shift knob position representing a respective gear box mode for the motor vehicle, a function of a detected occupant state of an occupant of the motor vehicle, or a detected state of attention of a driver of the motor vehicle, or detected weather data in the surroundings of the motor vehicle.

14. The system of claim 8, wherein the target speed setpoint is selected as the selection routine as a function of detected swarm data of a motor vehicle swarm, the swarm data comprising an average cornering speed of the motor vehicle swarm for passing through the curve.

15. A method for assisting cornering of a motor vehicle using a driver assistance system, comprising:

configuring a first assistance mode for the driver assistance system to perform assisted lateral guidance and longitudinal guidance of the motor vehicle;

configuring a second assistance mode for the driver assistance system to perform longitudinal guidance of the motor vehicle;

comparing, based on sensor data comprising a curve data record and a specified lateral acceleration limit for the motor vehicle, (i) a first potential cornering speed under the first assistance mode for driving through a curve, wherein the first potential cornering speed comprises a permitted cornering speed determined based on the specified lateral acceleration limit and the curve data record, acceleration and (ii) a second potential cornering speed under the second assistance mode for driving through the curve, wherein the second potential cornering speed is determined independent of the specified lateral acceleration limit for longitudinal guidance of the motor vehicle; and selecting one of the first or second potential cornering speeds as a target speed setpoint for driving through the curve using a specified selection routine, wherein the target speed setpoint is configured to be applied by the driver assistance system to control the steering system and/or the cruise control system during cornering, if the comparing determines that the first potential cornering speed is less than the second potential cornering speed, and wherein (i) the first assistance mode is selected for driving through the curve if the first potential cornering speed is selected as the target speed setpoint, or (ii) the first assistance mode is selected for driving through the curve if the second potential cornering speed is selected as the target speed setpoint, and subsequently selecting the second assistance mode when a current lateral acceleration of the motor vehicle exceeds the specified lateral acceleration.

16. The method of claim 15, wherein the first potential cornering speed is defined as a function of a first specified curve data record.

17. The method of claim 15, wherein the second potential cornering speed is defined as a function of a second specified curve data record, which is different from the first curve data record, and the current driving speed.

18. The method of claim 15, wherein the selection routine is performed only if the comparing determines that the first potential cornering speed deviates from the second potential cornering speed by at least a predetermined limit value.

19. The method of claim 15, wherein the target speed setpoint is selected as the selection routine as a function of one of:

a preset driving profile mode of the motor vehicle, a shift knob position representing a respective gear box mode for the motor vehicle, a function of a detected occupant state of an occupant of the motor vehicle, or a detected state of attention of a driver of the motor vehicle, or detected weather data in the surroundings of the motor vehicle.

20. The method of claim 15, wherein the target speed setpoint is selected as the selection routine as a function of detected swarm data of a motor vehicle swarm, the swarm data comprising an average cornering speed of the motor vehicle swarm for passing through the curve.

* * * * *